Feb. 27, 1951  P. W. KLOOZ ET AL  2,543,244
FEEDING MECHANISM
Filed Aug. 29, 1945  5 Sheets-Sheet 1

Inventors
Paul W. Klooz
Sidney R. Bates
By Rockwell H. Bartholow
Attorneys

Patented Feb. 27, 1951

2,543,244

UNITED STATES PATENT OFFICE 2,543,244

FEEDING MECHANISM

Paul W. Klooz, West Hartford, and Sidney R. Bates, New Britain, Conn., assignor to The Holo-Krome Screw Corporation, Hartford, Conn., a corporation of Connecticut Application August 29, 1945, Serial No. 613,292

6 Claims. (Cl. 10—162)

1

This invention relates to feeding mechanism, and more particularly to a mechanism for feeding small objects such as hollow screw blanks to a specified location as required in connection with the manufacture of socketed screws, for example, where the hollow blank in the process of being formed into a screw is to undergo certain machine operations, such as trimming and threading.

In the manufacture of small screws provided with internal wrench sockets, the feeding of the blanks to the screw machine has presented many practical difficulties. The screws are quite small, and where it has been necessary to have an operator pick up the blanks and place them in the correct position for gravity feed to the machine, it has been impossible to supply the machine with the blanks with the necessary rapidity and accuracy. The correct placing of the blanks in position is somewhat complicated by the fact that the blank is closed at one end and open at the other end, it being necessary to have the open end face toward the bottom or floor of the feed chute.

The present invention deals with provisions whereby the blanks are fed to the machine mechanically in a rapid and sufficient supply. Moreover, the invention, providing a mechanical feed, aims to solve a further problem, namely, to provide a mechanical feed which is satisfactory and reliable in a case where the object to be fed, of the general character above indicated, has a length which is the same or which approximates the width or diameter. Where this condition has existed it has been unusually difficult to provide a mechanical feed which would insure a proper supply of the blanks to the screw machine.

One of the objects, then, of the present invention is to provide a satisfactory feed for blanks, open at one end and closed at the other end, and having a length approximating the width.

Another object is to provide improved mechanism for supplying to the screw machine blanks which are socketed at one end only.

Another object is to provide an improved feeding mechanism for small hollow pieces of the general character above indicated.

2

In the drawings, the invention is shown in connection with the feeding of blanks for small socketed screws. In the manufacture of such screws a substantially cylindrical blank is operated upon for the purpose of forming a socket in one end, such socket usually being of hexagonal shape. After this step the blank is taken to another machine for further operations thereon, which operations are carried out in a so-called screw machine. These operations may comprise the trimming of the blank adjacent its open end, and the external threading of the blank. In the present instance it may be assumed that one or both of these operations are performed in a suitable automatic machine. With such a machine the improved feeding mechanism is associated for the purpose of delivering blanks thereto. Inasmuch as the screw machine proper forms no part of the present invention, the same is only partially shown in the drawings. In general, it may be said that the improved feeding mechanism is placed in a position over the framework of the screw machine and is suitably supported from this framework, the details of the supporting means being different when and as the feeding mechanism is used in connection with different screw machines. The feeding mechanism has an inclined guideway down which the blanks travel by gravity in moving to the screw machine, and the screw machine usually has a suitable movable picker or carrier, such as an oscillating carrier for picking off a blank from the delivery end of the guideway or chute and moving it over to the operative mechanism of the screw machine.

In its general features the feeding mechanism of our invention includes a hopper section into which a mass of blanks is dumped, said section having as a part thereof a conveyor carrying blanks upwardly along an incline from the low point of the hopper, and taking the blanks in a continuous line on the conveyor out of the high end of the hopper to a delivery or stripping point adjacent what may be termed the summit of the conveyor. This part of the mechanism provides what may be termed the hopper and conveyor section. A second section of the feeding mechanism is provided by furnishing a guideway or chute inclined downwardly from the conveyor summit and adapted to receive blanks from the conveyor and carry them down a gradual incline in a continuous line, the downward feed being by gravity while the blanks stand on end. It is with the lower end of this guideway that the movable picker or carrier above mentioned is associated.

The movable conveyor previously mentioned is constituted by an endless chain which is suitably driven, and the upper run of which is located in association with the hopper so as to receive blanks therefrom. Adjacent the upper end of the conveyor a stripper is provided which strips the blanks from their carrying chain elements and guides them to the receiving end of the discharging guideway. There is also provided, as hereinafter described, a return chute which receives an excess of blanks being supplied from the conveyor to the discharging guideway.

Figure 1:
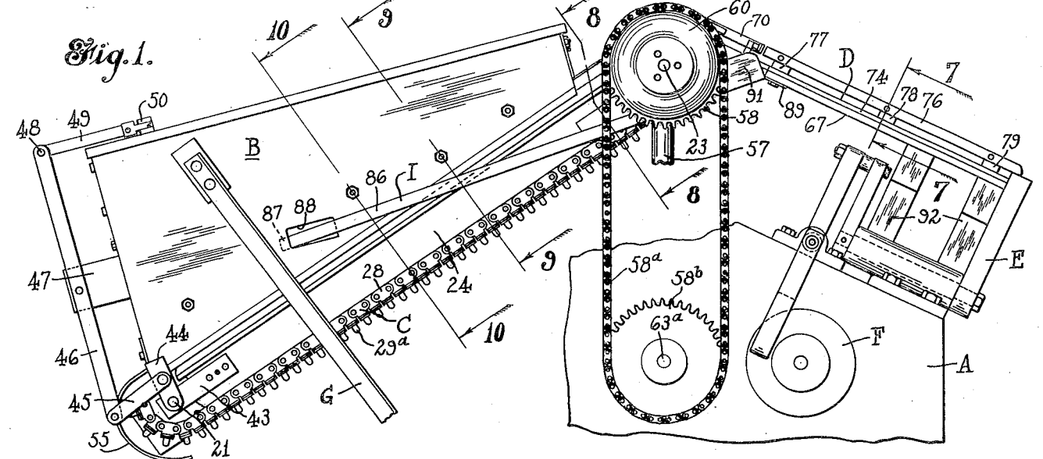
Fig. 1 is a side elevation of a feeding mechanism embodying our improvements, certain parts being omitted for the sake of clearness, and other parts being broken away.
Figure 2:
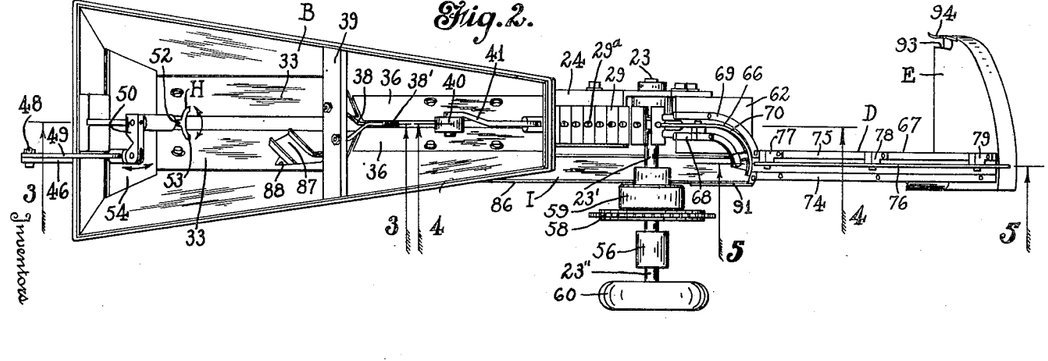
Fig. 2 is a top plan view of the mechanism shown in Fig. 1.
Figure 2A:
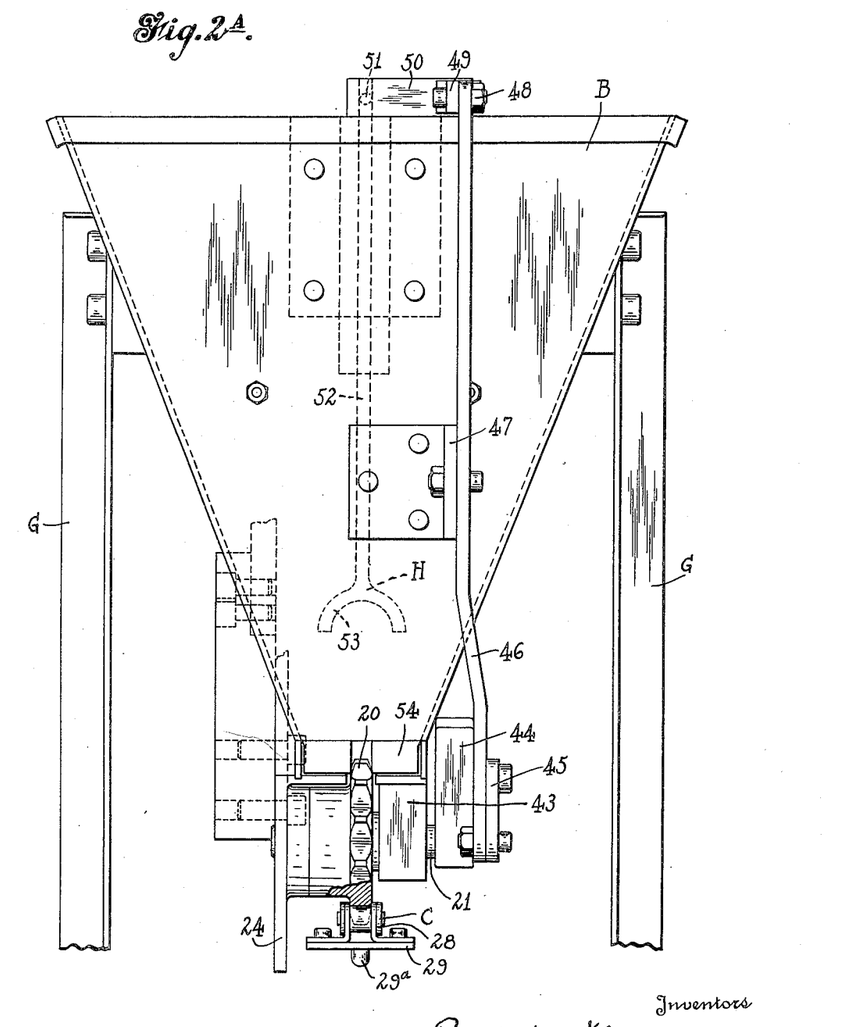
Fig. 2A is an enlarged end elevation of the mechanism, looking from the left of Fig. 1.

In Figs. 1 and 2 of the drawings the hopper and conveyor section of the apparatus is shown at the left, and the discharging guideway at the right. The frame of the screw machine is indicated at A, and the feeding mechanism is supported in a suitable manner from this frame. The hopper is shown at B, the conveyor chain at C, and the discharging guideway at D. With the lower end of the guideway D is associated the swinging picker or carrier E. The picker or carrier E is of a well-known kind, the same being of the oscillating type. Any suitable or preferred means may be employed for oscillating the member E, and in the form shown it is operated from a rotating cam F, which is provided as a part of the screw machine. The hopper B may be supported from the frame A by means such as side supports G, which are only partially shown. Near the left-hand end (Figs. 1 and 2) of the hopper there is provided an agitator, generally indicated at H, for the purpose of agitating the blanks that are contained as a mass in the lower part of the hopper, the agitation being for the purpose of causing the blanks to be caught upon projections provided upon the conveyor for engaging the sockets of the blanks so that the blanks will be carried along by the upper run of the conveyor chain. The return chute, previously mentioned, which returns excess blanks from a point on the discharging guideway to the interior of the hopper, is indicated at I.

Figures 3, 6A:
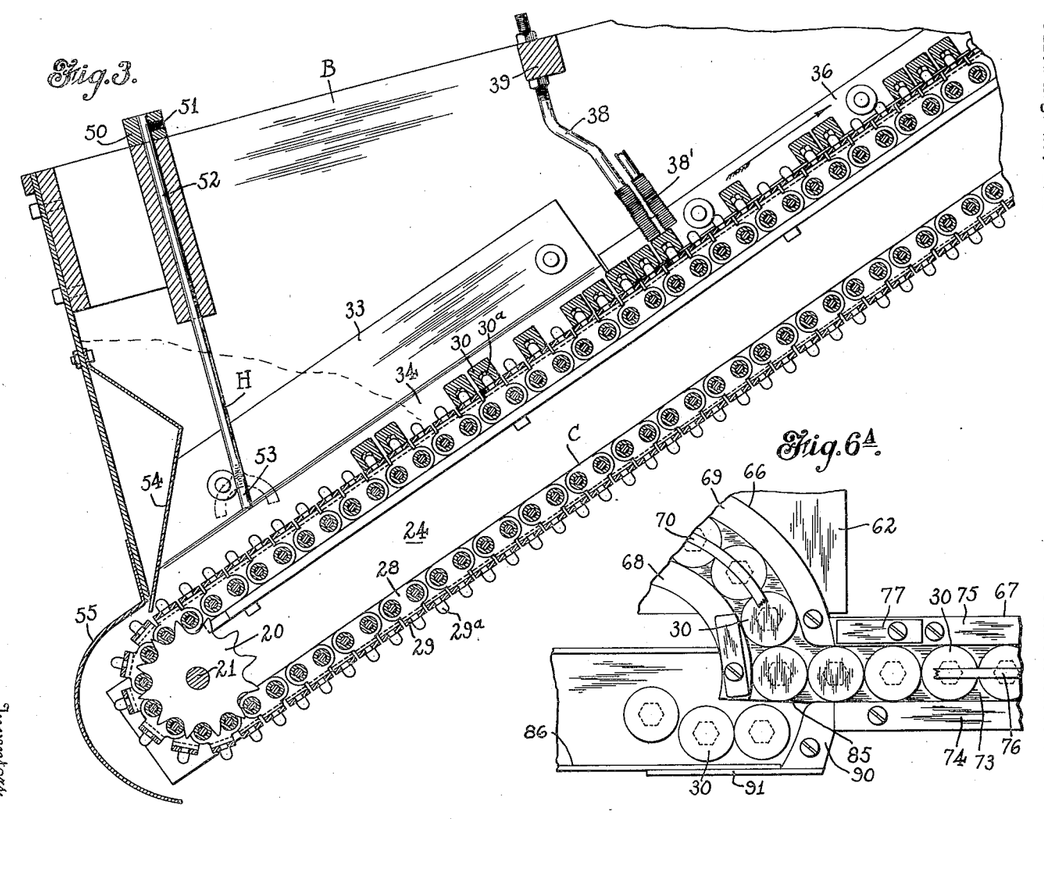
Fig. 3 is an enlarged vertical section on line 3—3 of Fig. 2.
Fig. 6A is a plan view partly broken away, showing on a larger scale certain parts appearing in Fig. 6.

Referring now to the details, it will be seen that the hopper B is of greater depth and of greater width at the left-hand end (Figs. 1 and 2). The bottom of the hopper is left open so as to receive the upper run of the conveyor chain C. The upper run of the conveyor is extended past the hopper, as indicated in Figs. 1 and 2. This chain runs over a sprocket 20 mounted on a shaft 21, said shaft being below the low point of the hopper, as shown in Fig. 3, and the chain also runs over an upper sprocket 22 mounted upon a shaft 23. Below and parallel to the hopper bottom is a main supporting angle bar 24, said angle bar acting as a support for the lower sprocket shaft 21. The upper sprocket shaft 23, on the other hand, is carried by a shorter and supplementary angle bar 25. The angle bar 24 has an upper laterally extending flange and a depending vertical flange, and this vertical flange has fastened to it a vertical flange of the angle bar 25. At its lower part the angle bar 25 has a laterally extending flange spaced from the laterally extending flange of the upper bar. The vertical flanges of the angle bars are interconnected by means such as screws 26. The screws 26 screw into sockets in the angle bar 25, and in association with these screws slots 27 are provided in the angle bar 24. By this arrangement the sprocket 22 is adjustable for the purpose of taking up slack in the conveyor chain.

Figures 5, 6, 10, 11:
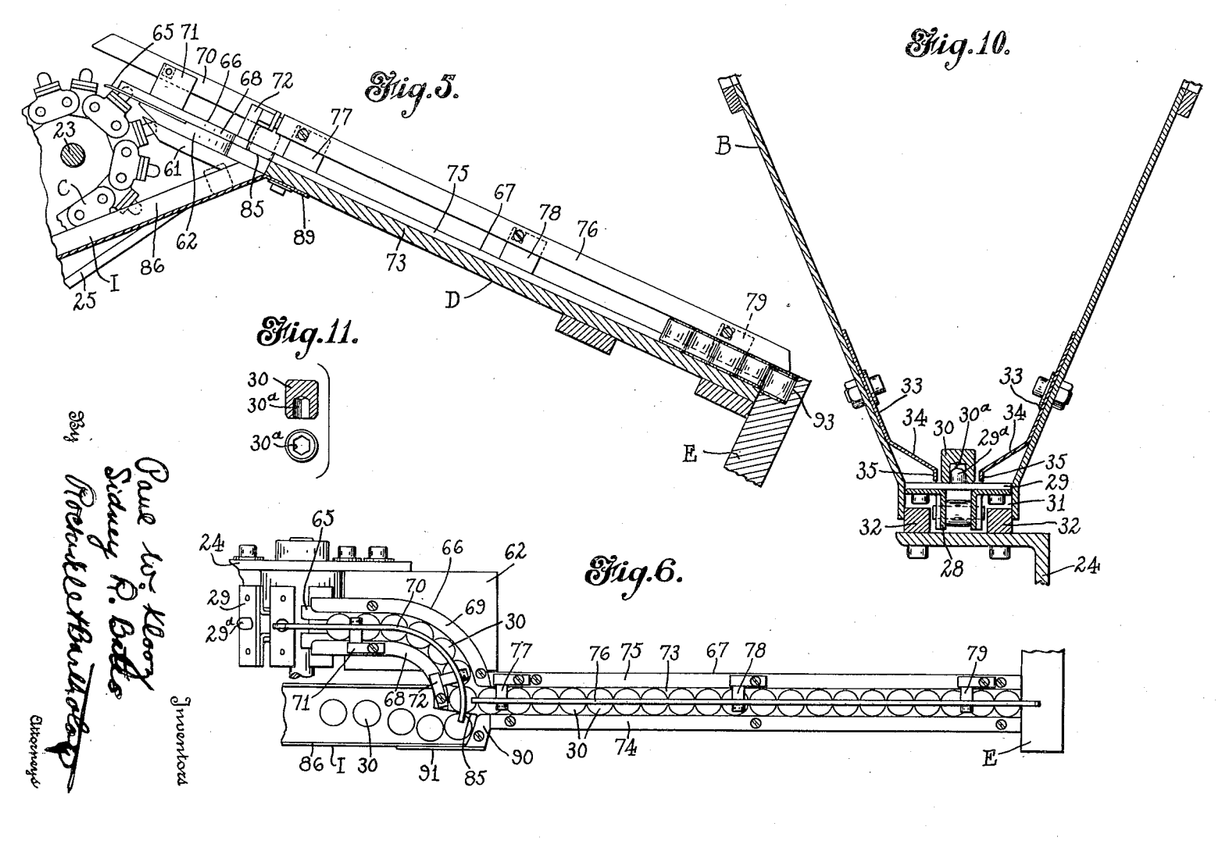
Fig. 5 is an enlarged section on line 5—5 of Fig. 2.
Fig. 6 is a top plan view on a larger scale of the delivery part of the mechanism.
Fig. 11 is a detail view of the blank, showing the same in axial section and in plan.

Each link 28 of the conveyor chain is pivoted at one end to a link at one side, and at the other end to a link at the opposite side, and the links are preferably made of sheet metal. Each link carries at the external part of the chain a relatively wide plate 29 which is considerably wider than the body of the link. Upon the external face of the plate 29 midway of its width is provided a rounded projection or boss 29$^a$ that is adapted to enter the hexagonal socket 30$^a$ of a blank 30 for the purpose of carrying the blank upon the travelling chain. The hopper B has a relatively narrow portion or throat 31 extending along its lower side, this throat being open at the lower part and engaging the external sides of strips 32 applied to the upper face of the angle bar 24. As shown in Fig. 10, the bodies of the chain links at the upper run of the chain extend with some clearance into the space between the two strips 32, and the plates 29 that carry the blanks travel with a small amount of clearance in the upper part of the throat 31. In the lower part of the hopper B guard plates 33, applied to the side walls of the hopper adjacent their inner faces, are provided with deflecting portions 34 that prevent the blanks from coming into contact with the end portions of the plates 29, and, on the other hand, guide the blanks toward those portions of the plates 29 where the carrying projections or pins 29$^a$ are provided. As shown in Fig. 10, this structure lends itself to the catching of the rounded ends of the projections 29$^a$ in the sockets of the blanks, and the blank when caught on the chain in this manner can travel in a relatively narrow space provided between lips 35 at the lower edges of the guard plates 33.

Figures 4, 7, 8, 9:
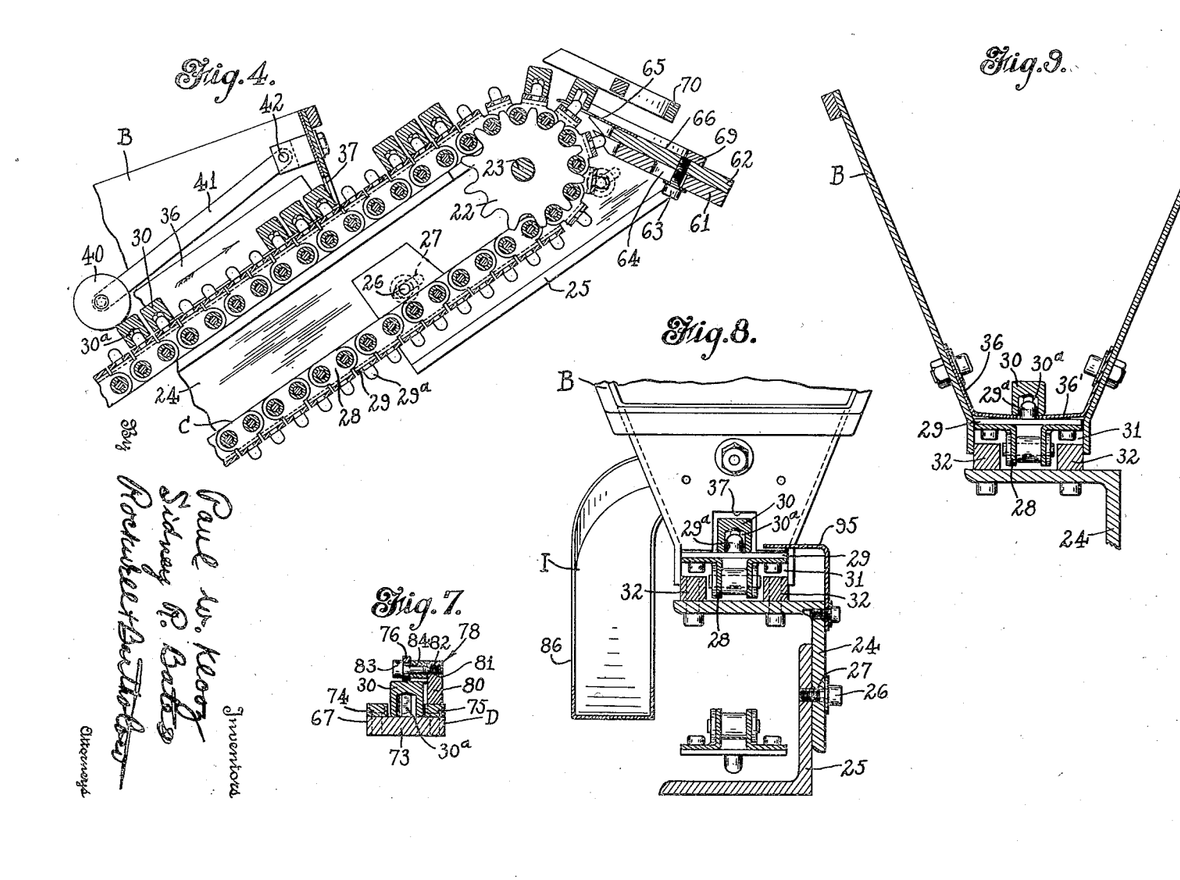
Fig. 4 is a similar section on line 4—4 of Fig. 2.
Fig. 7 is a section on line 7—7 of Fig. 1.
Figs. 8, 9 and 10 are, respectively, sections taken on the lines 8—8, 9—9 and 10—10 of Fig. 1.

Intermediate of the ends of the hopper the blanks which have engaged the chain and are moving upwardly with it pass out of the zone of the guard plates 33 and move into the zone of narrower sheet metal plates 36 provided upon the inner surfaces of the hopper side walls, as shown in Figs. 2, 3 and 9. These plates 36 have approximately horizontal lower portions 36', and these horizontal portions are of such width that they extend into close proximity to the chain projections 29$^a$. As a result the blanks pass up over the inner edges of the plate lips, as shown in Fig. 9, the lower edges of the blanks sliding upwardly over the plates as the chain travels along. The plates 36 extend substantially from the upper ends of the plates 33 to the upper part of the hopper, where the hopper has an exit opening 37 for the blanks carried on the chain. Shortly after passing into the zone of the plates 36 the blanks move under the lower ends of resilient wipers 38, of which a pair are provided, said wipers being supported from a crossbar 39 associated with the hopper. The wipers 38 preferably consist of depending rods, the lower ends of which have connected to them coil springs 38'. The springs 38' wipe against the upper surfaces of the blanks carried by the chain, and if any of the blanks are insecurely seated on their carrying projections, they are either more securely seated or are wiped off so as to drop back into the lower part of the hopper.

Shortly after the blanks pass beyond the resilient wipers or brushes, they enter into the zone of action of a presser roller 40 carried at the end of a pivoted arm 41 pivoted at 42 within the hopper. The roller has appreciable weight, and riding upon the upper ends of the blanks tends to force them down upon their projections or pins so that the blanks as they leave the hopper will be securely seated.

The lower chain sprocket shaft 21 is mounted from the angle bar 24 by means including a strap or cleat 43, which projects downwardly past the lower end of the angle bar and provides a bearing for the sprocket shaft. The agitator H, previously referred to, is preferably driven from this sprocket shaft, and the arrangement may be as follows:

The sprocket shaft 21 has applied to it at one end a crank arm 44 to which is pivoted a pitman 45. The pitman 45 is pivoted to one end of a walking beam 46, which is pivoted at its intermediate part to a bracket 47 applied externally to the end wall of the hopper. The upper end of the walking beam is pivoted at 48 to an arm 49. The opposite end of the arm 49 is connected to a crank-like member 50 fixed by a screw 51 to the upper end of an agitator rod 52. The agitator rod 52 has a forked lower end 53 projecting downwardly into the lower portion of the hopper in the space above the chain and between the guard plates 33. It will be understood that the rotation of the sprocket shaft 21 causes the crank arm 44 to be revolved, oscillating the walking beam 46 and causing, by the in-and-out reciprocation of arm 49, a turning of the agitating fork 53. The agitating fork turns through an angle of approximately 90° and then moves back again, the result being that there is active agitation of the mass of blanks lying against the upper run of the chain in this region.

The blanks are supplied to the hopper in such quantities that they are maintained at a level such as indicated by the dotted line in Fig. 3. This mass of blanks is held in the space defined by the side walls of the hopper and its lower end wall, and the chain running along in the throat at the lower part of the hopper.

For preventing escape of blanks by way of the space between the chain and the lower end wall of the hopper, a suitable guard plate 54 may be provided within the hopper. Preferably the sprocket portion and chain portion, which would otherwise be accessible adjacent the lower corner of the hopper, are covered over by a suitable external guard plate 55.

The sprocket shaft 23 has a bearing at one end in the angle bar 25, and at the opposite end is supported in a bearing 56, which in turn is supported from the frame of the machine by a supporting member 57, only partially shown in Fig. 1. The shaft 23 is made in separate sections 23' and 23", the latter carrying a chain-driven sprocket 58 and being adapted for connection with section 23' by a friction clutch 59 of any appropriate kind, the friction clutch being operable by means such as a hand wheel 60. Over sprocket 58 runs a drive chain 58ª, which is driven from a sprocket 58ᵇ carried by a driving shaft 63ª, which is a part of the screw machine. The upper sprocket 58 is continuously rotated, but the shaft section 23' is driven only when the friction clutch 59 is engaged, and when shaft section 23' is driven the conveyor chain C is driven in the proper direction.

The angle bar 25 also acts as a support for the guideway or magazine D, which, at its upper end, is connected to this angle bar. Support for the guideway or magazine is effected through a plate 61 fixed in a suitable manner to the upper end of the angle bar. Placed over the plate 61 is a plate 62, which acts as a platform onto which the blanks ride as they are stripped off of the conveyor chain. Connection is made between plates 61 and 62 by means such as screws 63 threaded into the plate 62 and passing through slots 64 in plate 61, so that a certain amount of adjustment is possible between the plate 62 and the delivery portion of the chain. The blanks are stripped from a portion of the chain which is directly supported by the sprocket 22. In the preferred arrangement the upper end of the plate 62 (Fig. 4) is provided with a projecting sheet metal fork member 65, which serves as a stripper. As the blank moves about the sprocket axis, the lower edge of the blank and the adjacent supporting plate of the corresponding chain link are presented toward the extremity of the fixed stripper fork, and the blank is caused to ride over the upper surface of the fork and onto the plate 62.

The inclined guideway or magazine D is made in two sections, one of these sections being a curved section, generally indicated at 66, and associated with plate 62, and the other section being a straight section generally indicated at 67, the upper end of section 67 being suitably connected to section 66. The section 66 is formed in part by a portion of the plate 62, and in part by side guide strips 68 and 69 which are applied to said plate in a suitable manner. It will be noted from Fig. 2 that the section 67 is laterally offset from the conveyor chain, and that the section 66 is adapted to carry blanks stripped off from the conveyor chain in a downward direction, and along a gradual curve to the receiving end of the guideway section 67. For this purpose the strips 68 and 69 are provided with appropriate curved portions. The guideway section 66 also includes as a part thereof an overhead rail 70, which is also appropriately curved, this rail being placed over the guideway along a median line in a position to confine the blanks from above and prevent their becoming displaced. The rail 70 in this form is supported from the strip 68 by suitable lateral supports 71 and 72, the preferred construction of which will be mentioned hereinafter.

The guideway section 67 is constructed similarly to the other section, comprising an underlying elongated plate 73 to the upper face of which are applied guide strips 74 and 75 to furnish a guide channel receiving the lower ends of upstanding blanks with a small amount of clearance. Over the top of this channel is a guide rail 76 held in place from strip 75 by means of lateral supports 77, 78 and 79. One of these supports is shown in detail in Fig. 7, and it will be noted that it comprises a side piece 80 fastened to and rising from the underlying guide strip, and having adjacent the upper end a screw socket 81 engaged by the threaded shank of a screw 82. The screw 82 has a head 83 abutted against a side face of the rail 76, and between rail 76 and the support 80 a spacing sleeve 84 is interposed.

The guide section 66 is arranged to deliver to section 67, and the arrangement is also such that excess blanks provided in the curved portion of the guide by delivery from the conveyor will be moved into the return chute I, previously mentioned. For this purpose the curved portion of the guide is provided with an ejection mouth, generally indicated at 85 in Fig. 6, from which mouth the excess blanks drop down into the upper end portion of the chute I. This chute may be formed of a sheet metal member having bent-up side flanges 86. The chute is inclined downwardly at a slight angle to the horizontal adjacent the side of the hopper, and has a discharging portion 87 passing through an opening 88 in the side of the hopper, the arrangement being such that the excess blanks will be returned to the upper portion of the pile of blanks in the hopper. The upper end of the chute I may have a flange portion 89 suitably fastened to the lower surface of the plate 73. A short strip 90 may be positioned at the side of the ejection mouth 85 for guiding the excess blanks into the chute, and a wall 91 may be provided to prevent the blanks from falling out of the receiving end of the chute, this wall 91 being placed transversely to their line of travel as the blanks move out of the curved guideway in a lateral direction and laterally into the upper end portion of the return chute.

Adjacent its lower end the guideway or magazine D is supported from the machine frame A by suitable means, for example, by members 92.

The picker or carrier E, previously mentioned, is arranged to oscillate about an axis parallel to the axis of the adjacent portion or guideway D, and it acts to carry the blanks one by one from the end of the guideway to the screw machine mechanism. While delivering one blank to this mechanism, it makes contact with the next succeeding blank at the side of the latter in a manner to hold the series of blanks in the guideway. The member E is generally in the form of a plate, having at one side of its operating axis a socket 93 for a blank, said socket having a spring finger 94 associated therewith. As shown in Fig. 2, the picker is in a position where it will deliver a blank to another picker, not shown, its body in the meantime holding the series of blanks in the guideway. As the picker is moved on its axis, the picker portion 93, 94 is moved back to pick up another blank, and is then moved in the opposite direction back to the position shown in Fig. 2.

It is believed that the operation of the machine for the most part will be clear from the foregoing description. It is to be understood that the guideway or magazine D will be maintained full of blanks, so that there will be a continuous supply of blanks to the screw machine. It is also to be understood that the conveyor chain delivering to the magazine will usually not be completely filled with blanks at its delivery portion, although there will be more than an ample supply for the capacity of the machine. The lower part of the hopper will be kept supplied with blanks about to the level previously indicated. The blanks in this mass will be churned up and agitated by the agitator device, thereby increasing the chances of the blank being caught on the pins of the chain. The condition shown in Figs. 3 and 4 of the drawings may be taken as typical so far as the upward movement of blanks by the chain is concerned, although it is understood that the condition varies from moment to moment.

In a mechanism of this character a primary aim is to insure the magazine being filled at all times, and consequently in the described mechanism the conveyor section has a capacity somewhat greater than actually needed, providing an excess of blanks adjacent the delivery end and the excess being returned to the hopper by means such as herein described. In the particular form shown, the excess is removed after the blanks have been received by the guideway or magazine, the removal being at a point intermediate of the ends of the guideway. It is understood that in the form shown the blanks move into the receiving mouth of the upper guideway section, and then move downward by a sliding movement through the curved portion of the guideway. When the blank reaches the end portion of the curved part of the guideway, as shown in Fig. 6, it is sliding by gravity along a slight incline, and the action of gravity would, under normal conditions, cause it to turn the corner from the curved guideway section into the straight section. However, the pressure from the oncoming blanks delivered from the conveyor has to be taken into account, and this forward pressure is sufficient, if the straight section is full of blanks, to give the blank in question a sufficient lateral push to cause it to drop into the receiving end of the return chute. If and when this pressure from the oncoming blanks is relieved, a blank will turn the corner and be received in the straight portion of the magazine. By the features described the machine is given ample capacity for the intended purposes.

The handling of screw blanks of this general nature has in the past been quite difficult to accomplish, especially where the length and diameter of the blanks have been approximately equal. For engagement of the blanks with the conveyor pins, it is required that the blanks be faced at a certain angle so that their open ends will catch over the pins. To achieve this the carrying run of the chain should be at the proper inclination and should form the bottom of a narrow throat to which the blanks are delivered from above, the blanks being subjected to agitation so that a sufficient number will be faced downwardly over the pins. In the form shown in the drawings, the upper run of the conveyor chain is at an angle of approximately 35° to a horizontal plane. The lower part of the hopper is narrowed, as previously described, to insure the blanks being moved into a location over the pins.

In Fig. 8 there is shown at 95 a guard extending over the upper run of the chain where the latter issues from the hopper, said guard being for the purpose of preventing chips from the screw machine from entering the spaces between the chain links and interfering with the operation of the machine.

The guideway or magazine is at an inclination such that the blanks will slide down it readily, but not at too rapid a rate. In the form shown, the inclination of this guideway to the horizontal is approximately 25°. As appears from Figs. 4 and 5, this guideway is arranged substantially tangentially with reference to the upper sprocket of the conveyor, this being the preferred arrangement. Preferably, as shown, the hopper is of a length such that it extends throughout the greater part of the upper chain run, the hopper receiving the mass of blanks in the wider lower portion thereof, and there being within the upper portion of the hopper the wiping devices and the pressure member, as previously described. As these devices operate within the hopper space, any blanks displaced by them or in their locality will be under control within the hopper, because they will be returned by gravity along the slanting lower portion of the hopper to the collection of blanks which is being acted upon in the lower portion thereof by the agitator H. The hopper is also of a length such that the return chute passing through one of the side walls thereof may deliver blanks to the top of the mass or pile previously mentioned. In certain aspects of the invention, of course, the specific structure of the agitator, the wiper, the pressure device, and the return device for excess blanks, is not material.

An important result achieved by the invention is the satisfactory feeding by mechanical means of blanks which, because of their inherent characteristics, previously required the filling of chutes or guideways by hand. Heretofore it was necessary to pick up a blank from a receptacle, inspect it, and then place it in the guideway with the open end downwardly directed. Under such conditions it was difficult, if not impossible, to provide continuous operation of the screw machine at a production level near the capacity of the machine. By the present invention a satisfactory mechanical feed is provided for the blanks, and the guideway or magazine can be kept filled, the supply of blanks fed to the magazine being ample. The conveyor is driven from a shaft of the screw machine in most cases, and hence as the machine is speeded up or slowed down the rate of operation of the feeding mechanism is changed correspondingly.

The invention is not limited to the feeding of blanks of the particular kind illustrated in the drawings, for it obviously can be used in connection with the feeding of objects of a generally similar nature.

In the drawings only one form of the improved mechanism is shown, but it will be understood that the invention can take various forms, and that many modifications and changes may be made without departure from the principles of the invention or the scope of the claims.

What we claim is:

1. In mechanism such as described, the combination of a hopper having an upwardly inclined open lower portion or throat, a conveyor chain having an upper run upwardly inclined and traveling upwardly in said throat and moving beyond the hopper to carry blanks in an upward direction, said chain being provided with blank-centering pins to catch and carry along in upstanding positions blanks which have socketed lower ends engaging the pins, a downwardly inclined slideway having a lower supporting surface for the lower ends of the blanks to which the upper run of the chain delivers the blanks in standing position, said slideway having side guide members to guide the blanks in their downward movement, said guide members being located adjacent the lower parts of the blanks, an upper rail-like retainer supported from one of said side guide members which extends over the upper ends of the blanks in close adjacency thereto as the blanks move downwardly on said slideway, said slideway having at a point intermediate of its length an offset portion whereby the line of travel of the blanks changes from a straight line to a curve and then to an offset straight line, the slideway being provided adjacent the point where the last-mentioned change of direction occurs with a side delivery mouth, and an inclined chute having an upper end leading from said mouth to an opening in the side of the hopper so as to return excess blanks to the hopper.

2. In mechanism for feeding cylindrical articles having substantially flat ends of which one only has a central re-entrant recess or socket, a hopper for the articles which is elongated in one direction and provided at the under part with an open throat that is relatively narrow and at an angle to the horizontal, a conveyor chain having an upper upwardly delivering run extending lengthwise of and operating in said throat, which run extends upwardly beyond the adjacent end of the hopper, the hopper being wider and deeper toward the lower part of said chain run, said chain carrying pins which in the upper run of the chain are upstanding and have upper extremities adapted to become engaged in the sockets of the articles or blanks for carrying them in a series in an upward direction, agitating means within the hopper adjacent the lower end thereof comprising a downwardly disposed oscillating rod member turning about an approximately upright axis and having downturned agitating arms above the upper run of the chain in the lower part of the hopper for stirring a mass of the articles in the lower part of the hopper, a wiper within the upper part of the hopper intermediate of its ends adapted to seat more securely articles engaging the chain or to wipe them from the chain, a pressure device within the upper part of the hopper near its discharging end comprising a heavy member adapted to press down upon and more firmly seat articles engaging the pins, a gravity slide adjacent the end of the upper chain run to receive the articles from the chain and support them in positions in which they stand or slide with their lower ends engaging the slide, and a fixed stripper over which the articles pass from the chain to the slide.

3. In mechanism for feeding cylindrical blanks, each having a closed end and an open end provided with a central re-entrant recess or socket, a hopper for the blanks having an upwardly inclined open lower portion or throat, a conveyor chain having an upper run upwardly inclined adjacent said lower portion or throat and traveling upwardly and adapted to carry blanks beyond the delivery end of the hopper, said hopper being provided with interior means for stirring a mass of the blanks in the lower portion of the hopper over said chain run whereby a number of the blanks have their socketed ends disposed downwardly over the chain run, said chain run having upstanding pins which enter the blank sockets to carry the blanks upwardly, and said chain also having surfaces to support the lower ends of blanks disposed over said pins, and a gravity slideway adjacent the upper end of said chain run arranged at a small angle to the horizontal to receive blanks from said chain run and having a supporting surface engaged by the lower ends of the blanks as the blanks move downwardly on the slideway in standing position.

4. In mechanism for feeding cylindrical blanks each having a closed end and an open or socketed opposite end, the combination of a hopper having an upwardly inclined lower open portion or throat and provided with a stirrer adapted to stir a mass of blanks in the lower part of the hopper so that a number of the blanks will have their socketed ends disposed downwardly, a conveyor chain having an upper run upwardly inclined and traveling upwardly adjacent said throat to carry blanks from said mass beyond the upper end of the hopper, said chain run being provided with upstanding pins to enter the downwardly disposed socketed ends of adjacent blanks and carry said blanks along in upstanding positions on the pins, means within the hopper engaging the blanks caught on the pins to position the blanks with respect to the pins, and a slideway having a lower supporting surface arranged at a small angle to the horizontal adapted to support downwardly sliding blanks in upstanding position and to which said chain delivers blanks with their socketed ends disposed downwardly.

5. In a feeding mechanism for feeding cylindrical blanks, each having a closed end and an open end provided with a socket, the combination of a hopper having an upwardly inclined open lower portion or throat, a conveyor chain having an upper run upwardly inclined and traveling upwardly adjacent said throat to carry the blanks in an upward direction beyond the hopper, said hopper being provided with agitating means whereby a mass of blanks in the lower portion of the hopper over the chain run will be agitated or stirred so that a number of the blanks in the mass will have their socketed ends disposed downwardly over the chain run, said chain run being provided with upstanding pins which enter the sockets of certain blanks and carry the blanks upwardly in upstanding positions, said chain run also having a plurality of hinged links provided with cross plates from which said pins extend, said cross plates having upper surfaces on which rest the lower ends of blanks supported on said pins, and a downwardly inclined slideway having an upper end to which the upper run of said chain delivers the blanks, said slideway having a lower supporting surface for the blanks on which their lower socketed ends are engaged as they slide in a downward direction.

6. In feeding mechanism for feeding cylindrical blanks, each having a closed end and an open end provided with a socket, the combination of a hopper having an upwardly inclined open lower portion or throat, a conveyor chain having an upper run upwardly inclined and traveling upwardly adjacent said throat to carry the blanks in an upward direction beyond the hopper, said hopper being provided with agitating means whereby a mass of blanks in the lower portion of the hopper over the chain run will be agitated or stirred so that a number of the blanks in the mass will have their socketed ends disposed downwardly over the chain run, said chain run being provided with upstanding pins which enter the sockets of certain blanks and carry the blanks upwardly in upstanding positions, a downwardly inclined slideway having an upper end to which the upper run of said chain delivers the blanks, said slideway having a lower supporting surface for the blanks on which their lower socketed ends are engaged as they slide in a downward direction, said slideway also being provided with side and top retainer bars and with a lateral delivery mouth intermediate of its ends for excess blanks, and a chute leading from said mouth to an opening in one side of the hopper, said opening being lower than said mouth and said chute being inclined downwardly from said mouth to said opening for conducting excess blanks back into the hopper at one side of the hopper.

PAUL W. KLOOZ.
SIDNEY R. BATES.

REFERENCES CITED

The following references are of record in the file of this patent:

UNITED STATES PATENTS

| Number | Name | Date |
| --- | --- | --- |
| 582,988 | Hoyete et al. | May 18, 1897 |
| 831,905 | Thom | Sept. 25, 1906 |
| 1,026,083 | Duston | May 10, 1912 |
| 1,182,183 | Lilley | May 9, 1916 |
| 1,550,803 | Harbison | Aug. 25, 1925 |
| 1,604,128 | Lorden | Oct. 26, 1926 |
| 2,002,147 | Jordan | May 21, 1935 |
| 2,244,128 | Wilcox | Jan. 10, 1941 |
| 2,284,698 | Trotter | June 2, 1942 |